(12) United States Patent
Colosso et al.

(10) Patent No.: US 7,962,424 B1
(45) Date of Patent: Jun. 14, 2011

(54) OVERDRAFT LICENSES AND LICENSE DISTRIBUTION

(75) Inventors: Juan-Carlos Colosso, Mt. View, CA (US); Katherine K. Nadell, Sunnyvale, CA (US); Wei Cheng, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1002 days.

(21) Appl. No.: 11/585,561

(22) Filed: Oct. 24, 2006

(51) Int. Cl.
*G06F 21/00* (2006.01)

(52) U.S. Cl. ............ 705/901; 705/50; 705/51; 705/54; 705/57; 705/59; 705/902; 705/903; 705/904; 705/908; 705/911; 380/227; 380/228; 380/229; 380/230; 380/201; 380/202; 380/203; 380/204

(58) Field of Classification Search ............ 705/50, 705/51, 54, 57, 59, 901–904, 908, 911; 380/227–230, 201–204
See application file for complete search history.

(56) References Cited

U.S. PATENT DOCUMENTS

| 5,204,897 | A | * | 4/1993 | Wyman .................... 710/200 |
| 5,579,222 | A | | 11/1996 | Bains et al. |
| 5,745,879 | A | | 4/1998 | Wyman |
| 6,615,191 | B1 | | 9/2003 | Seeley |
| 6,760,324 | B1 | | 7/2004 | Scott et al. |
| 7,035,918 | B1 | | 4/2006 | Redding et al. |
| 7,603,318 | B1 | | 10/2009 | Colosso et al. |
| 2002/0065781 | A1 | | 5/2002 | Hillegass et al. |
| 2002/0107809 | A1 | | 8/2002 | Biddle et al. |
| 2002/0169625 | A1 | | 11/2002 | Yang et al. |
| 2004/0059678 | A1 | * | 3/2004 | Stefik et al. .................. 705/51 |
| 2004/0078339 | A1 | | 4/2004 | Goringe et al. |
| 2004/0088176 | A1 | | 5/2004 | Rajamani |
| 2004/0117467 | A1 | | 6/2004 | Rich et al. |
| 2004/0117784 | A1 | | 6/2004 | Endoh |
| 2005/0102240 | A1 | | 5/2005 | Misra et al. |
| 2005/0132347 | A1 | | 6/2005 | Harper et al. |
| 2006/0265334 | A9 | | 11/2006 | Cutter et al. |
| 2007/0026942 | A1 | | 2/2007 | Kinsley et al. |

FOREIGN PATENT DOCUMENTS

JP 07200492 A * 8/1995

* cited by examiner

*Primary Examiner* — James A Reagan
(74) *Attorney, Agent, or Firm* — Kilpatrick Townsend & Stockton LLP

(57) ABSTRACT

In response to receiving an order (e.g., including payment for one or more software licenses), a license distribution manager allocates a specified number of software licenses for distribution to a corresponding customer's clients that utilize the licenses to operate software associated with a corresponding vendor software application. The license distribution manager can allocate one or more overdraft licenses for distribution to the customer in addition to the specified number of software licenses associated with the order. Accordingly, the license distribution manager can allocate extra software licenses (e.g., the overdraft licenses) and distribute more software licenses than are actually purchased by a respective customer. This enables the customer to use one or more provisional licenses (e.g., overdraft licenses) that support restricted use of the vendor's software application such as until the customer can replace the provisional licenses with corresponding purchased licenses.

26 Claims, 8 Drawing Sheets

OVERDRAFT LICENSES AND LICENSE DISTRIBUTION

RELATED APPLICATIONS

This application is related to U.S. patent applications entitled "SURRENDER AND MANAGEMENT OF SOFTWARE LICENSES," (Ser. No. 11/585,512), "LICENSE DISTRIBUTION," (Ser. No. 11/585,734), "SOFTWARE LICENSE DISTRIBUTION AND REGISTRATION BYPASSING," (Ser. No. 11/585,559), all of which are being filed on the same date as the present application (by the common assignee Adobe Systems, Inc.), the entire teachings of all of which are incorporated herein by this reference.

BACKGROUND

Software vendors typically require a purchase of a corresponding software license in order to enable a respective user the right to download, install, and/or use a software application. For example, in a retail setting, a respective user can purchase a CD (Compact Disk) or other type of storage including a software program for downloading onto a respective computer system owned by the user. Such a CD can include a serial number. The serial number provided by the vendor enables downloading and/or installation of the software application stored on the CD.

As an example, when downloading or attempting to execute the software program, a respective installer program for installing the software application on the user's computer system may require the user to input the serial number associated with the CD. Upon receipt of the serial number by the installer program, the installer program sends the serial number over a network to a server managed by the vendor of the software program being downloaded or executed. In general, the vendor's server uses the serial number to track and identify which specific copy of the software application is being downloaded to or executed on a respective computer system.

In addition to the serial number, the vendor's server may require further input (e.g., a user's, name, address, business, etc.) from a respective user to register the software program for use. After obtaining such information from the user, the server typically provides an authentication code enabling the respective user to install and/or execute the software program on the user's computer system.

SUMMARY

Conventional techniques for distributing software licenses enabling operation of a corresponding vendor's software application suffer from a number of deficiencies. For example, conventional techniques enable a respective organization to purchase a number of software licenses for distribution to respective clients (e.g., users and/or computer systems) associated with the organization. For example, an organization may require and purchase ten licenses, one for each of ten different users in the organization. A licensing server receiving this order can thereafter enable distribution of up to the ten purchased software licenses by the organization. Such techniques are limiting, for example, because conventional techniques do not take into account that a respective purchaser may not properly estimate the number of licenses needed for the organization. By way of example, the organization may actually need twelve software licenses instead of ten. In such a circumstance, the organization will have to place a new purchase order for the additional number of software licenses to account for the shortfall. Typically, generation of another purchase order for the new licenses requires approval at multiple levels of the organization, including the organization's financial department. Thus, there may be a lengthy delay between a time that the organization needs the new licenses and the time the organization is actually able to obtain the new licenses from the software vendor. This length delay may impact a development schedule since software vendors will normally not enable distribution of corresponding software licenses until the vendor receives the order as well as payment for the new licenses.

One way to overcome this problem is to order more software licenses than the organization expects to use. For example, the organization can order fifteen licenses instead of ten. However, this requires that the purchaser (e.g., organization) pay for licenses that the organization may not use. Consequently, the organization may be reluctant to purchase the software licenses because the organization may end up paying for licenses that it will not use.

Techniques discussed herein deviate with respect to conventional applications such as those discussed above as well as additional techniques also known in the prior art. For example, certain specific embodiments herein are directed to overcoming deficiencies associated with the above-mentioned techniques and/or other deficiencies in the prior art not mentioned above.

Conventional techniques as discussed above have implemented overdraft licenses for concurrent licensing applications. As will be discussed further in this specification, certain embodiments herein include issuing time-limited overdraft licenses on a per-seat basis. Overdraft licenses distributed on a per-seat basis can have vendor specific policies such as duration (as indicated) and persistency (whether they can or cannot be reused by clients on the network). For certain vendors, overdraft licenses are not persistent in the pool. This means that if an overdraft is downloaded to a given client machine, that overdraft is "consumed" and will not be re-established in the pool. These and other details will be discussed below.

In a general embodiment as described herein, a license distribution manager receives a purchase order for a specified number of multiple software licenses. In response to receiving the order (e.g., including payment for the licenses), the license distribution manager allocates a specified number of software licenses for distribution to a corresponding customer's clients that utilize the licenses to operate software associated with a corresponding vendor software application. The license distribution manager can create one or more extra licenses (e.g., overdraft licenses) for distribution in addition to the specified number of software licenses associated with the order. Accordingly, the license distribution manager can create extra software licenses (e.g., the overdraft licenses) and distribute more software licenses than are actually purchased by a respective customer, alleviating a potential problem that would otherwise occur if the customer happened to erroneously order fewer licenses than were actually needed by the organization. In other words, the overdraft licenses (e.g., one or more non-purchased or non-ordered software licenses) created and/or supplied by the vendor-operated license distribution manager enable the customer to at least temporarily use as many software licenses as required by the customer until the (provisional) overdraft licenses provided by the license distribution manager are replaced with regular software licenses purchased by the customer.

According to one configuration, a vendor may choose that a number of overdraft licenses be automatically added to every order of purchased application licenses, with no up-front costs to the customer. Other possible implementations may not include automatically provided the overdraft licenses, but rather only for customers who agree to pay a given fee for having the option to use a specified number of overdrafts. When such option is exercised, the software vendor may use the paid fee towards the payment of the full license or some other financial arrangement.

The one or more embodiments as described herein contrast with conventional license distribution models that only provide an amount of licenses as specified by a respective purchase order. As discussed above, enabling distribution of only an ordered amount of licenses can be detrimental to a customer that needs extra licenses on short order. Conventional systems thus do not provide an easy way to allocate additional software licenses for distribution to the customer's clients.

Models for distributing software licenses can vary depending on the application. For example, according to one embodiment herein, the license distribution manager is a publicly accessible, vendor-managed server that distributes the software licenses over a network (e.g., the Internet) to one or more clients associated with the customer placing the order. According to other embodiments herein, the license distribution manager distributes the software licenses from a customer-managed server to the one or more customers associated with the client. Additional embodiments provide yet other ways to distribute software licenses.

Overdraft licenses according to embodiments herein can provide the same type of user privileges as those afforded by the original licenses associated with the order or be restricted. For example, in this latter embodiment, an overdraft license can be limited with respect to usage time and/or available software features. More specifically, the overdraft licenses can be configured to be valid (enabling operation of corresponding vendor software) for a limited time duration, after which the overdraft license expires and a respective client using the overdraft license can no longer operate the corresponding vendor software application. In addition to or in lieu of modifying a time-based parameter associated with the overdraft licenses, the overdraft licenses can be configured to limit how many software features are available to a respective user of the corresponding vendor software application. Limiting parameters (i.e., configuring the overdraft license to have a limited operational scope) associated with overdraft licenses can provide incentive for a respective customer to replace the temporary overdraft licenses with a corresponding one or more regular software licenses purchased by the customer. The number of overdraft licenses allocated and thereafter distributed to the customer's clients can also vary depending on the application. For example, larger or loyal customers can be afforded a greater number of overdraft licenses for use than newer customers.

In addition to the embodiments as discussed above, the customer can receive notification when all of the software licenses associated with an original order have been distributed to the customer's clients. In addition to or in lieu of this notification, the network administrator can be notified each time the license distribution manager distributes one or more of the overdraft licenses to the customer's clients. Accordingly, the customer can be put on notice that the provisional licenses (e.g., distributed overdraft licenses) need to be converted to regular purchased licenses some time in the future. Accordingly, the customer will not be surprised of an expiration of the one or more overdraft licenses issued to the customer's users.

Embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product that has a computer-readable medium including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present application is directed to a computer program product that includes a computer readable medium having instructions stored thereon for supporting operations such as distribution of one or more overdraft licenses. The instructions, when carried out by a processor of a respective computer device, cause the processor to perform the steps of: i) allocating a specified number of software licenses for distribution; ii) allocating one or more overdraft licenses in order to enable distribution of more than the specified number of software licenses; iii) distributing the specified number of software licenses to enable operation of a corresponding vendor software application; and iv) distributing the overdraft license to enable operation of the corresponding vendor software application. The numbering of the steps has been added for clarity sake, these steps need not be performed in any particular order.

Other embodiments of the present disclosure include software programs to perform any of the method embodiment steps and operations summarized above and disclosed in detail below.

Also, it is to be understood that the system, method and apparatus herein can be embodied strictly as a software program, as software and hardware, or as hardware alone such as within a processor, or within an operating system or a within a software application. Example embodiments of the invention may be implemented within products and/or software applications such as those manufactured by Adobe Systems, Inc. of San Jose, Calif., USA.

As discussed above, techniques herein are well suited for use in distribution of software licenses such as overdraft licenses. However, it should be noted that embodiments herein are not limited to use in such applications and that the techniques discussed herein are well suited for other applications as well. Note that each of the different features, techniques, configurations, etc. discussed herein can be executed independently or in combination. Accordingly, the present invention can be embodied and viewed in many different ways.

Note that this summary does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations)

of the invention, the reader is directed to the Detailed Description section and corresponding figures of the present disclosure.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to an example embodiment as described herein, in response to receiving an order (e.g., including payment for one or more software licenses), a license distribution manager (e.g., a license server) allocates a specified number of software licenses for distribution to a corresponding customer's clients (e.g., employees) that utilize the licenses to operate software associated with a corresponding vendor software application. The license distribution manager can create and/or allocate one or more overdraft licenses for distribution to the customer's clients in addition to the specified number of software licenses associated with the order. Accordingly, the license distribution manager can allocate extra software licenses (e.g., the overdraft licenses) and distribute more software licenses than are actually purchased by a respective customer. This enables the customer to use one or more provisional licenses that support temporary use of the vendor's software application such as until the customer can replace the provisional licenses with corresponding purchased licenses.

Use of overdraft licenses as described herein contrasts with conventional license distribution models that only provide an amount of licenses as specified by a respective purchase order. As discussed above, conventional techniques of limiting distribution of licenses to only those specified in a purchase order as in conventional distribution models can be detrimental to a customer that needs extra licenses on short order. Conventional systems thus do not provide an easy way to allocate additional software licenses for distribution to the customer's clients. (There are multiple non-electronic licensing models that have the notion of all-you-can-eat licensing, with a "pay-up" option every 12 months or so).

Figure 1:
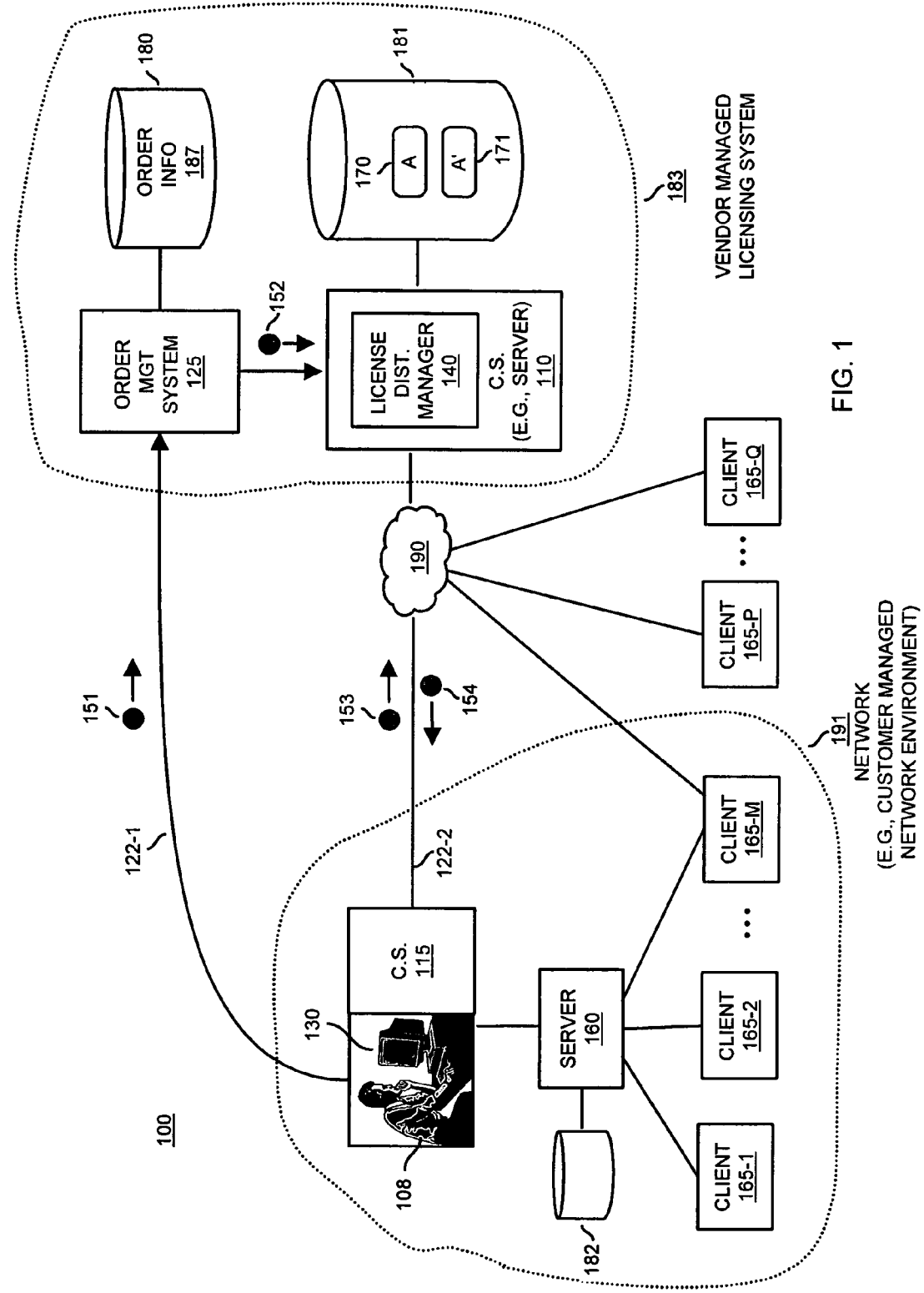
FIG. 1 is an example diagram of a computer network environment enabling distribution of overdraft licenses from a vendor-managed (remote) server according to embodiments herein.

FIG. 1 is a diagram of a computer network environment 100 supporting distribution of software licenses according to embodiments herein. As shown, computer network environment 100 includes network 191, network 190, and a vendor managed licensing system 183. The vendor management licensing system 183 includes an order management system 125, repository 180 for storing order information 187, computer system 110 for executing license distribution manager 140, and repository 181 for storing license information 170 (e.g., information associated with a set of purchased, and/or ordered licenses) and license information 171 (e.g., information associated with a set of one or more overdraft licenses). Network 191 such as a customer-managed network environment includes user 108, display screen 130, computer system 115, server 160, and clients 165 (e.g., client 165-1, client 165-2, client 165-3, . . . , client 165-M). Computer network environment 100 also includes client 165-P, . . . client 165-Q associated with the customer that operates network 191. These latter clients (namely, clients 165-P . . . 165-Q) can be home-based computers in which a customer's employees work out of their homes and have access to a public network such as the Internet.

In one embodiment, each of clients 165 (e.g., end users such as employees, terminal computer equipment such as a personal computer, etc.) includes a computer device operated by a respective user in an organization (e.g., a company, firm, group of persons, etc.). In order to download and/or execute software applications on a respective client, the corresponding client first obtains a software license provided by a respective software vendor. The following disclosure illustrates example embodiments in which a user 108 (e.g., a network administrator or employee of an organization purchasing the software licenses) orders and/or purchases a respective set of software licenses. In response to a respective order for software licenses, a license distribution server (e.g., computer system 110, server 160, or some other distribution source or method) enables distribution of the ordered software licenses as well as one or more overdraft licenses.

More specifically, as illustrated in FIG. 1, the user 108 initially places an order 151 (e.g., a purchase order) for a group of software licenses (for distribution to clients 165) from a respective software vendor based on communications over link 122-1 (e.g., a telephone link, internet connection, postal service, etc.) to order management system 125. Assume in this example that the customer places an order for one hundred software licenses for use of a particular software application.

As briefly mentioned above, user 108 (or other representative of an organization as the case may be) can place an order 151 in many different ways. For example, the user 108 can communicate over a telephone link to an operator at vendor A to place an order for multiple software licenses. As another example, the user 108 also can log onto a website served by the order management system 125 and submit an order for multiple software licenses. As yet another example, a user 108 can send an order 151 via a delivery service (e.g., U.S. Postal Service) to order management system 125, and so on.

Order management system 125 of vendor managed licensing system 183 can include people and/or corresponding computer resources for managing orders from many different customers in addition to the order 151 from user 108. The order management system 125 can create the appropriate licensing information enabling license distribution manager 140 or server 160 that later on distributes licenses to clients 165 (165-1 . . . 165-M).

As shown, for a specific one of many possible orders received from many customers, order management system 125 stores order information 187 in repository 180 (e.g., a database, data storage facility, memory, etc.). Order information 187 associated with order 151 can include customer information such as the name or identifier of a customer placing a purchase order, a purchase order number associated with an order, a payment status of the order, billing information, authorization information enabling operation of target software, a number of licenses and corresponding versions/features of the software licenses being purchased, etc.

According to one configuration, after approval to grant software licenses associated with order 151, the order management system 125 communicates with a license distribution server such as license distribution manager 140 of computer system 110. Such a communication 152 can include an indication that a set of ordered software licenses can be distributed based on further instructions provided by the customer making the purchase order. For example, in one embodiment, the order management system 125 confirms payment for the order (or at least that the order was placed by a creditworthy customer) and forwards a pool of license information 152 (associated with order 151 by Acme Development Company) over a respective network connection (e.g., a local area network, public network such as the interne, etc.) to the license distribution manager 140.

Based on receipt of the pool of license information, the license distribution manager 140, in turn, stores the pool of license information in repository 181 as license information 170 (e.g., labeled A). In other words, the order management system 125 and/or license distribution manager 140 allocate a number of overdraft licenses in license information 171 (e.g., license pool A') for distribution to clients 165. Recall that in the present example, the pool of licenses A as specified by license information 170 includes one hundred software licenses allocated for use by clients 165 (e.g., computer systems and/or employees associated with the customer placing order 151) in computer network environment 100. An approval message received from by the license distribution manager 140 from the order management system 125 or mere receipt of the license information 170 and/or license information 171 can indicate that the license distribution manager 140 is free to enable distribution of the software licenses in license pool A.

Via an exchange of messages (e.g., messages 153 and messages 154), the license distribution manager 140 can initially notify respective user 108 that the software licenses associated with the order 151 have been approved and/or are ready for distribution based on selection by the user 108. The user 108 can specify how to distribute the one hundred ordered software licenses via one or more servers (e.g., computer system 110, server 160, etc.) as discussed in related U.S. patent application entitled "LICENSE DISTRIBUTION," (Ser. No. 11/585,734), filed on the same date as the present disclosure, the entire teachings of which are incorporated herein by this reference.

After selection of a respective server to distribute a set of licenses associated with order 151, the licenses are ready for distribution. Assume in the present example that the user 108 (or other decision-making authority) specifies to have the licenses in license pool A distributed from a vendor-managed server such as computer system 110. In such an example, the license distribution manager 140 enables distribution of software licenses in license pool A to clients 165. In addition to enabling distribution of the software licenses (e.g., one hundred software licenses ordered or purchased by a respective customer such as ACME Development Company), the computer system 110 also enables distribution of a set of one or more overdraft licenses as specified by license information 171 (labeled as license pool A'). the order management system 125 and/or license distribution manager 140 can create the license information 171 for the overdraft licenses in license pool A'.

The licenses (e.g., ordered licenses and/or overdraft licenses) can be distributed on per-seat basis such as a perpetual licenses or alternatively as floating licenses. In general, per-seat types of licenses are distributed only once to clients 165 that, in turn, use the licenses for long durations whereas the floating licenses are distributed, returned, and redistributed amongst the different clients 165 on an as-needed basis (e.g., each day or session when a client requests use of a license).

As previously discussed, the licenses as specified by license pool A' can be provisional licenses, whereas license in license pool A can be a set of software licenses specifically ordered by the customer. Note that license pool A' (i.e., the overdraft licenses) can be created before, during, or after distribution of the software licenses in license pool A. According to one configuration as will be discussed later in this specification, the license distribution manager 140 distributes software licenses in license pool A (e.g., the specified number of software licenses in order 151) in response to receiving respective requests from multiple clients 165 associated with a customer that placed order 151. After distributing all of the software licenses as specified by license pool A to a corresponding group of clients 165, the license distribution manager 140 can receive a request from another client for a software license to enable operation of a corresponding vendor software application. In response to receiving this additional request (e.g., the one hundred and first request), the license distribution manager 140 distributes an overdraft license to the requesting client. Thus, license distribution manager 140 can be configured to allocate and thereafter distribute or begin distributing the overdraft licenses in license pool A' after distributing all of the software licenses available in license pool A. However, there may exist circumstances when it is beneficial to distribute one or more of the licenses in license pool A' before distributing all of the software licenses in license pool A. For example, it may be known in advance that a particular client needs a license only for a short duration of time in which the overdraft license could be well-suited for such a purpose.

While this is a potential use, the above configuration can be modified. For example, a different example would be that while license pool A still has licenses available, such licenses have been explicitly reserved for clients 165-H, 165-I and 165-J. In this case, the license distribution manager 140 will serve an overdraft license from pool A' to a client 165-K when requesting a license (because the remaining three licenses in pool A are reserved for the specific clients as mentioned above).

According to one configuration, the clients 165 communicate over network 190 with license distribution manager 140 of computer system 110 to obtain a respective license (e.g., e-license) to use a respective vendor software application. In such an embodiment, use of a specific URL (Uniform Resource Locator) enables the clients 165 to access server 160 and obtain a so-called e-license (e.g., an ordered license, purchased license, overdraft license, etc.). In addition to and/or prior to obtaining an e-license from license distribution manager 140, a requesting client also can receive (e.g., by downloading) a copy of the vendor software application for installation on the requesting client's computer system. Depending on the embodiment, a network administrator and/or license distribution manager 140 may also be involved in initiating installation of the vendor's software on the clients 165.

Figure 2:
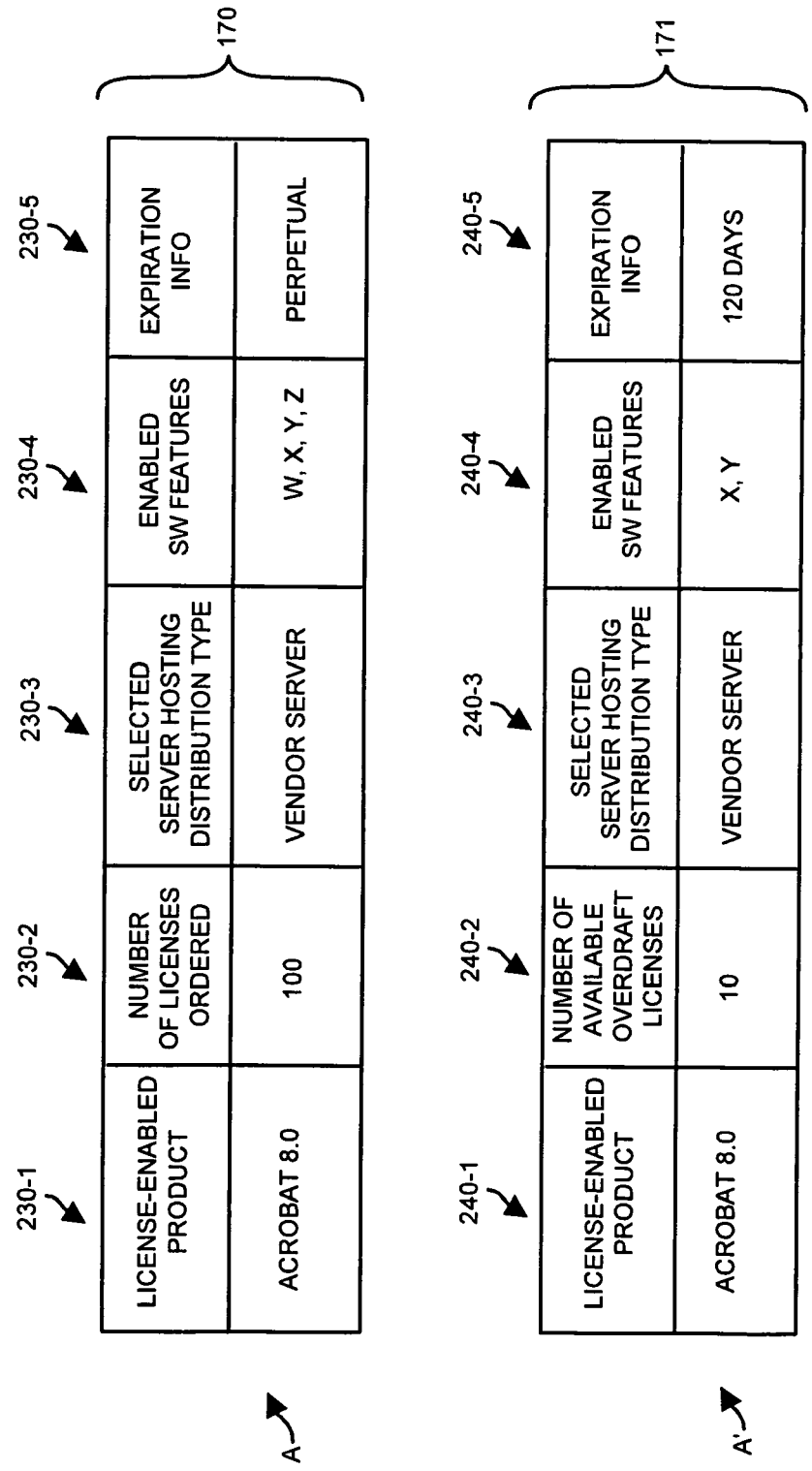
FIG. 2 is a diagram illustrating an example of ordered licenses and overdraft licenses according to embodiments herein.

FIG. 2 is a diagram illustrating an example purchase order and corresponding license information according to embodiments herein. In the context of the present example, the customer is Acme Development Company that submits an order 151 (e.g., purchase order 123456) for one hundred e-licenses to operate Acrobat™ version 8.0. As previously discussed, license information 170 includes configuration information for the licenses specified by order 151 (FIG. 1). In this example, column 230-1 indicates the type of software license (e.g., the target vendor software to which the licenses pertain), column 230-2 specifies the number of ordered licenses, column 230-3 specifies how the customer would like the licenses distributed, column 230-4 specifies software features to be enabled by the ordered licenses, and column 230-5 specifies a type or duration of a respective ordered license.

According to one configuration, selection of the hosting source for the licenses does not or need not take when placing the order is placed with the vendor. It happens after the order has been processed and invoiced. Likewise, purchased licenses may not have an associated expiration time. The point here is that the electronic license information need not be generated or provided at the purchase time, but rather at the fulfillment time.

As previously discussed, license information 171 includes the overdraft licenses and related information associated with order 151 (FIG. 1). In this example, column 240-1 indicates the type of software license, column 240-2 specifies the number of available overdraft licenses associated with order 151, column 240-3 specifies how the customer would like the licenses distributed, column 240-4 specifies software features to be enabled by the overdraft licenses, and column 240-5 specifies a type or duration associated with the overdraft licenses.

Note that license information 170 as well as license information 171 can include multiple entries (e.g., rows) specifying licenses for different types of vendor software and enabled features. For example, a first row of license information 170 can indicate license configuration information associated with a first portion (such as fifty of the one hundred ordered licenses) of the order 151 having software features X, Y, and Z enabled while a second row of license information 170 can indicate configuration information associated with a second portion (such as fifty of the one hundred ordered licenses) of the order 151 having software features W, X, and Y.

In general, parameters associated with the overdraft licenses as specified by license information 171 can vary depending on the application. For example, the number of available overdraft licenses can depend on how many licenses are specified by the order 151. According to one configuration, the license distribution manager 140 (or order management system 125 depending on which entity creates the overdraft licenses: vendors may choose that an entity other than the license distribution manager 140 create the overdrafts licenses) creates or enables a number of overdraft licenses based on a percentage of the licenses as specified by order 151. In the context of the present example, the customer is provided with a number of overdraft licenses (e.g., ten in this example) equal to 10% of the number (e.g., one hundred) of software licenses in the original order 151. In lieu of a percentage, the creator of the overdraft licenses can use any other suitable method to derive how many overdraft licenses shall be provided with a given order. Limiting creation and/or distribution of overdraft licenses to the customer's clients 165 depending on the specified number of software licenses associated with the order 151 provides incentive for the customer to purchase regular (e.g., perpetual) software licenses (to replace the distributed overdraft licenses) through normal channels if the customer happens to need more than the allocated number of overdraft licenses.

In addition to controlling a quantity of enabled overdraft licenses, the number of enabled features can adjusted for the overdraft licenses so that the overdraft licenses enable more, less, or the same number of features as the ordered software licenses. For example, the ordered licenses as specified by license information 170 indicate that features W, X, Y, and Z are enabled in the vendor software application (e.g., Acrobat™ 8.0). The number of software features enabled by the overdraft licenses can be limited to fewer than all of the features specified by license information 170. In the context of the present example, license information 171 indicates that the overdraft licenses enable features X and Y, which happens to be fewer than the features supported by the ordered software licenses. Limiting enabled software features can provide incentive for the customer to replace the distributed overdraft licenses with software licenses ordered and/or purchased (e.g., perpetual licenses) through normal channels.

In addition to the above parameters, the time duration of the respective overdraft licenses can be controlled to limit a length of time that a respective overdraft license is valid for using the vendor's software. For example, one or more of the overdraft licenses in license pool A' can be configured to expire one hundred and twenty days after a pertinent event such as first use of the overdraft license, distribution of the overdraft license, date of the purchase order, etc.

In the context of the present example in FIG. 2, the license information 170 specified that the ordered software licenses in license pool A have been configured as persistent software licenses or, more specifically, perpetual licenses enabling perpetual use of corresponding vendor software application over time. In other words, the software license does not expire after a certain timeframe. In contradistinction, the license information 171 specifies that the ten available overdraft licenses are configured to expire after a one hundred and twenty day timeframe as discussed above. Thus, the overdraft licenses can be configured as temporary or provisional software licenses enabling respective use of the corresponding vendor software application for a limited amount of time. Limiting how long a respective overdraft licenses remain valid can provide incentive for the customer to replace the overdraft licenses with software licenses ordered and/or purchased through normal sales channels.

According to further embodiments, both the software licenses as specified by the order 151 as well as any created or allocated overdraft licenses can be floating type licenses (e.g., temporary licenses) enabling use of the corresponding software license for a limited duration of time. In such embodiments, the license distribution manager 140 initially distributes the one hundred ordered licenses as floating licenses. After use, such as by the end of a respective working day, the clients 165 in computer network environment 100 return the software licenses to the license distribution manager for redistribution on a following day in which the license distribution manager 140 distributes the software licenses in license licenses pool A on a first come first served basis. One or more of the overdraft licenses in license pool A' can be configured as floating licenses that are issued to respective clients 165 after distribution of the software licenses (e.g., one hundred licenses) in license pool A. In the context of this example (e.g., distribution of floating licenses instead of permanent licenses), the ability to distribute the floating overdraft licenses can be limited to a specified time such as one hundred and twenty days from the time when the floating overdraft license is first distributed or used by a client. In the case of a floating overdraft licenses, the enabled time duration of an overdraft license can be 2 hours rather than a number of days. This is because under such models, the licenses float on the network for computers to use on as-needed basis rather for extended period of time across many days.

Figure 3:
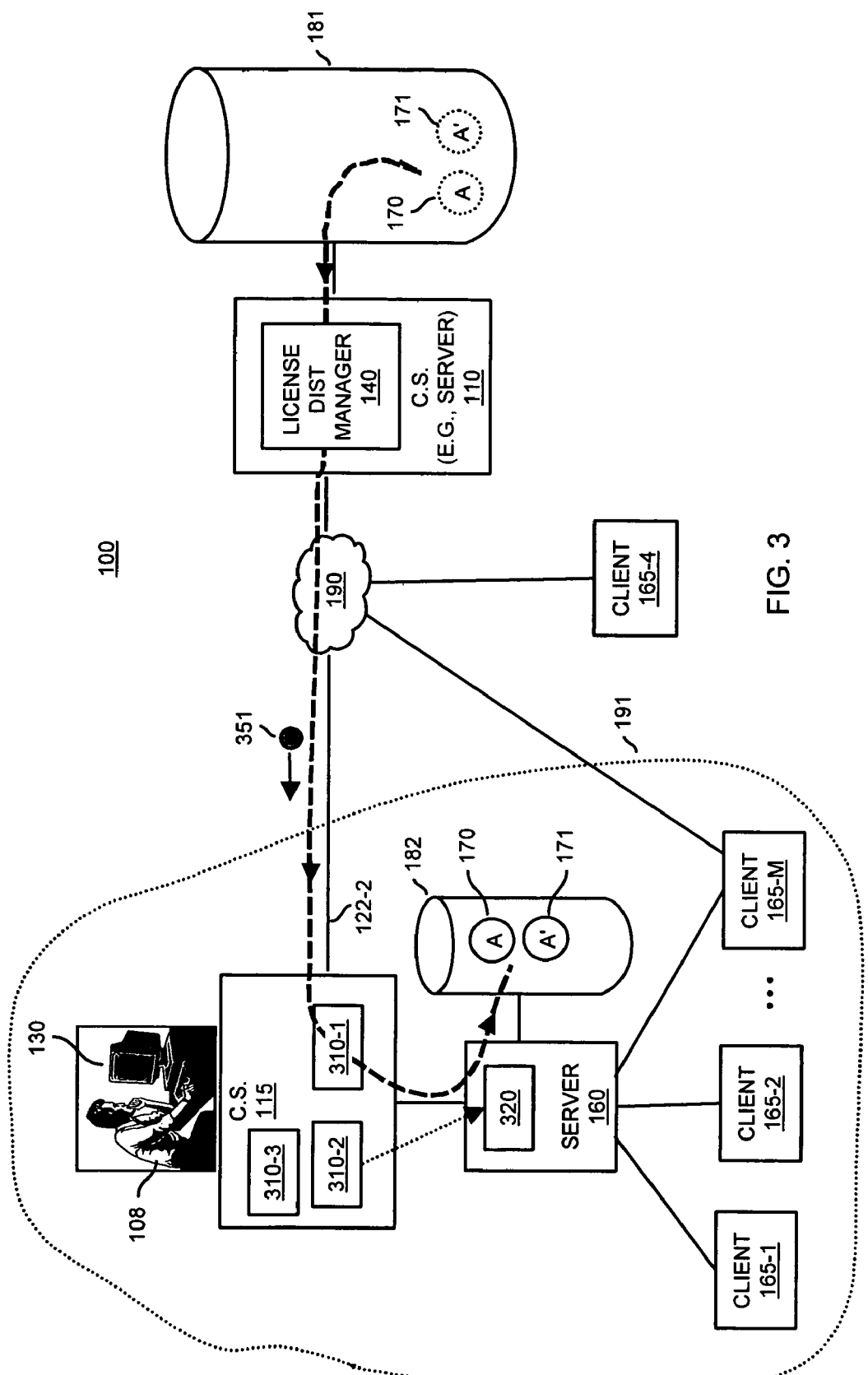
FIG. 3 is an example diagram of a computer network environment enabling distribution of overdraft licenses from a customer-managed (local) server according to embodiments herein.

The diagram as discussed above for FIG. 1 illustrates how a respective user can specifically select license distribution manager 140 in computer system 110 as a source for distribution of software licenses (including overdraft licenses) according to embodiments herein. Note that the customer placing a respective order 151 for software licenses also can specify server 160 as a source for distributing software licenses (including overdraft licenses). The actual function of distributing the software licenses from server 160 is similar to the technique as discussed above in FIG. 1. However, the user 108 may download software utilities as discussed in FIG. 3 to enable distribution of the software licenses. Accordingly, FIG. 3 is a diagram illustrating downloading and use of multiple utilities from license distribution manager 140 to support distribution and management of overdraft licenses from a locally managed customer server (e.g., server 160) according to embodiments herein.

In the example embodiment shown, via communication 351, the license distribution manager 140 provides utility 310-1 (e.g., a charge utility tool or license pool utility), utility 310-2 (e.g., server software), and utility 310-3 (e.g., administration software) to computer system 115. Note that the user 108 at computer system 115 executes the utilities 310 to carry out different functions as further discussed below.

For example, retrieval and subsequent execution of utility 310-1 at computer system 115 enables the user 108 to populate repository 182 with license pools A and A' (e.g., license information associated with one hundred software licenses designated to be distributed by an in-house server such as by server 160 owned by the customer placing the order 151 for the software licenses as discussed above). Utility 310-1 can be viewed as a charge utility tool because it "charges" repository 182 with licenses (and/or corresponding information) retrieved from repository 181.

According to one configuration, via a corresponding graphical user interface on display screen 130, the user 108 can specify a type of operating system that will be used to run the license distribution manager 320 (e.g., server software). Additionally, the user 108 downloads and/or retrieves a license server setup file (e.g., an XML file) from the license distribution manager 140. The license server setup file includes information required by the utility 310-1 to retrieve the license pools A and A' (e.g., a group of e-licenses) for storage in repository 182. In other words, the license server setup file enables the user 108 to charge server 160 with the software licenses in license pools A and A' corresponding to order 151.

In addition to utility 310-1 as discussed above, the license distribution manager 140 can enable transmission of utility 310-2 over network 190 to computer system 115. Execution of utility 310-2 enables user 108 to configure server 160 with license distribution manager 320. License distribution manager 320 can be a software application executed by the server 160, enabling respective clients 165 to obtain the software licenses in license pools A and A' from server 160 so that the clients 165 are able to execute the software (e.g., Acrobat™ 8.0) identified in the purchase order (e.g., order 151 in FIG. 1).

According to one embodiment, during corresponding operation, the license distribution manager 320 executing on server 160 locally keeps track of distribution of the software licenses to clients 165 in real-time. For example, after distribution of a first software license to a respective one of clients 165 in network 191, the license distribution manager 320 reduces the number of available software licenses to a value of ninety-nine assuming that license pool A initially includes one hundred licenses as discussed above. The licensing distribution manager 320 derives the value (e.g., ninety-nine) by subtracting one from the original number (e.g., one hundred) of available software licenses. After distribution of another software license to a client in network 191, the license distribution manager 320 reduces the number of available software licenses to a total number of ninety-eight; and so on until there are no licenses left to distribute. As previously discussed, after distribution of the software licenses in license pool A to clients 165, the server 160 initiates distribution of the overdraft licenses to clients 165 in computer network environment 100.

In addition to utility 310-1 and utility 310-2, the license distribution manager 140 can provide utility 310-3 over network 190 to computer system 115. Utility 310-3 enables the user 108 to manage license distribution manager 320 and corresponding license pools A and A'. For example, in one embodiment, utility 310-3 includes a graphical user interface enabling the user 108 to further control a distribution of software licenses in license pool A and A' to clients 165 as well as view status information indicating how many of the software licenses are available for use by other clients 165 in computer network environment 100. For example, a user can choose to distribute licenses from pools A and A' from computer system 110 or move the license pools A and A' to server 160 for distribution as shown in FIG. 3. Also note that a set of licenses can be apportioned for distribution from computer system 110 while another set of licenses can be apportioned for distribution from server 160.

Figure 4:
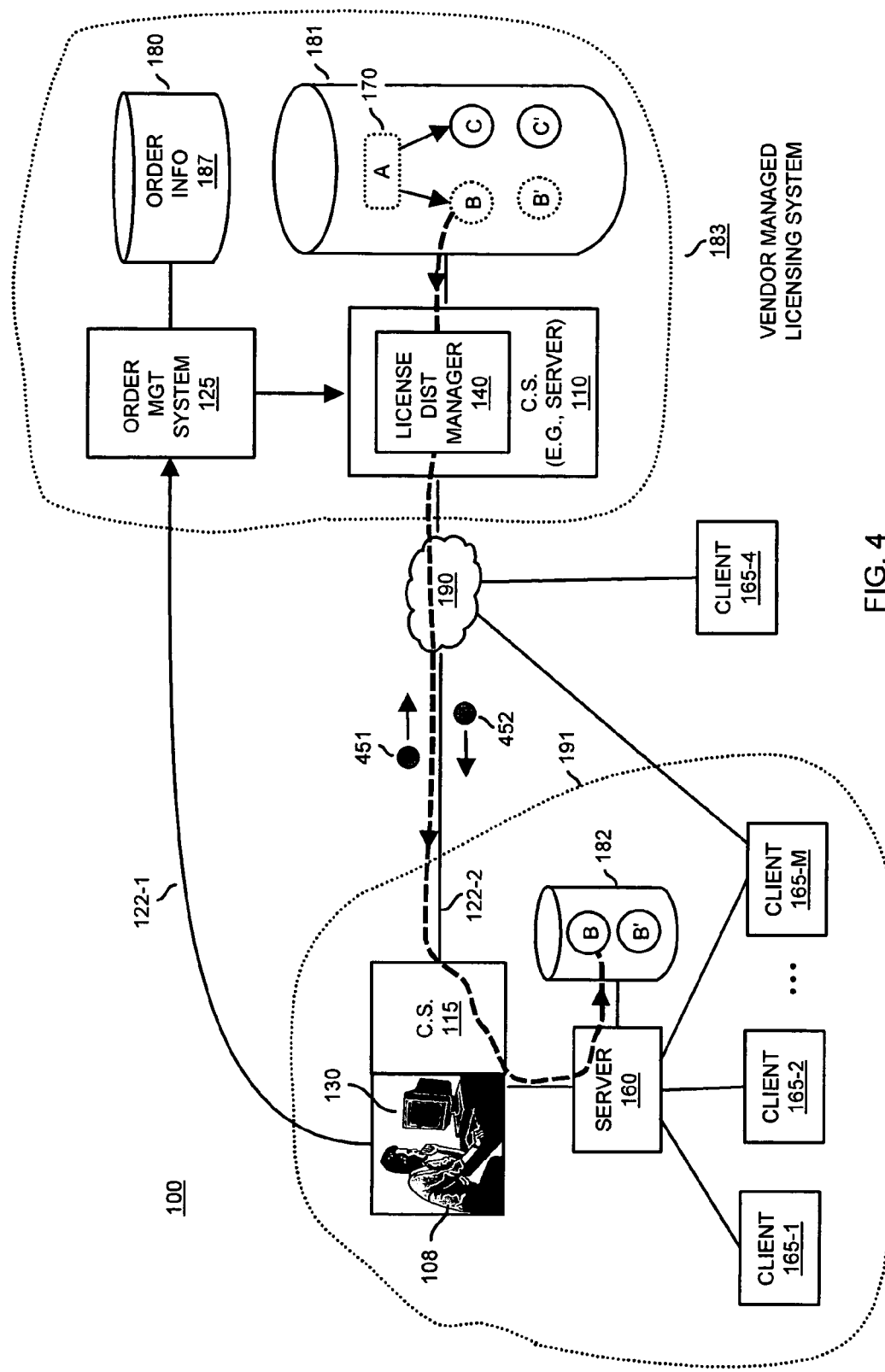
FIG. 4 is an example diagram illustrating serving of overdraft licenses from multiple servers according to embodiments herein.

FIG. 4 is an example diagram illustrating distribution of overdraft licenses from multiple sources according to embodiments herein. For example, the user (i.e., customer) can specify via communication 451 that a certain number of licenses shall be distributed from computer system 110 as well as server 160. In such embodiments, the license distribution manager initially parses the license pool A into license pool B and license pool C. Thereafter, via communications 452, the license distribution manager 140 initiates delivery of license pool B and corresponding set of overdraft licenses in license pool B' over network 190 to server 160 for storage in repository 182. Accordingly, as previously discussed, server 160 can distribute a portion of overdraft licenses to clients 165. License distribution manager 140 can distribute another portion of the overdraft licenses to clients 165 in computer network environment 100.

Assume that license pool A includes one hundred software licenses based on receipt of a respective purchase order. Assume further that the customer specifies that thirty five of the licenses in license pool A shall be distributed by server 160 while sixty five of the licenses in license pool A shall be distributed by computer system 110. In such an instance, the computer system 110 parses and delivers license pools B (e.g., thirty five regular purchased licenses) and license pool B' (e.g., one or more overdraft licenses) over network to server 160 for storage in repository 182. Note that in addition to specifying how many of the purchased licenses shall be distributed by server 160 and computer system 110, the user also can specify from which source to distribute the overdraft licenses. For example, in one embodiment, the user 108 can specify distribution of the overdraft licenses from either server 160 or computer system 110, or divide the available number of overdraft licenses such that both server 160 and license distribution manager 140 each distribute at least a portion of the overdraft licenses. Note that license distribution manager 140 can also have a default distribution of overdraft to ensure that both overdraft license pools (associated with computer system 110 and server 160) can have an allocation proportional to the number of licenses to be distributed from each source, respectively. This simplifies the work for administrator 108.

Upon distribution of one or more respective overdraft licenses, the source (e.g., server 160 and/or computer system 110) distributing the overdraft license can be configured to notify the user 108 (e.g., customer) via e-mail or other type of notification method that the distributed overdraft license forwarded to a respective client enables only temporary usage of the corresponding vendor software application. Accordingly, the user 108 can be made aware of the need to contact the vendor and purchase additional software licenses to replace the overdraft license, which may only be a temporary license.

In further embodiments, one or more of the overdraft licenses eventually distributed to clients 165 in computer network environment 100 can be configured to generate or enable a notification that the distributed overdraft license will eventually expire (or will expire very soon) and no longer will be able to operate the corresponding vendor software application. In other words, the respective client using the overdraft license can notify the user 108 and/or the person using the vendor's software application at the respective client that the overdraft license will eventually expire some time in the future. Thus, the user 108 (e.g., network administrator) can take appropriate action to replace the overdraft license with a regularly purchased license.

In yet further embodiments, a client in computer network environment 100 receiving and using a respective overdraft license can be configured to poll a software distribution source (e.g., server 160 and/or computer system 110) in order to check whether the overdraft license currently used by the polling client can be replaced with a regular purchased software license. If a corresponding distribution source has a regular software license available, the provisional overdraft license can be replaced with the non-provisional license. Alternatively, the respective license server can be configured to repeatedly check whether any regular licenses (e.g., purchased or permanent licenses) are available to replace any overdraft licenses currently used by the clients 165.

Figure 5:
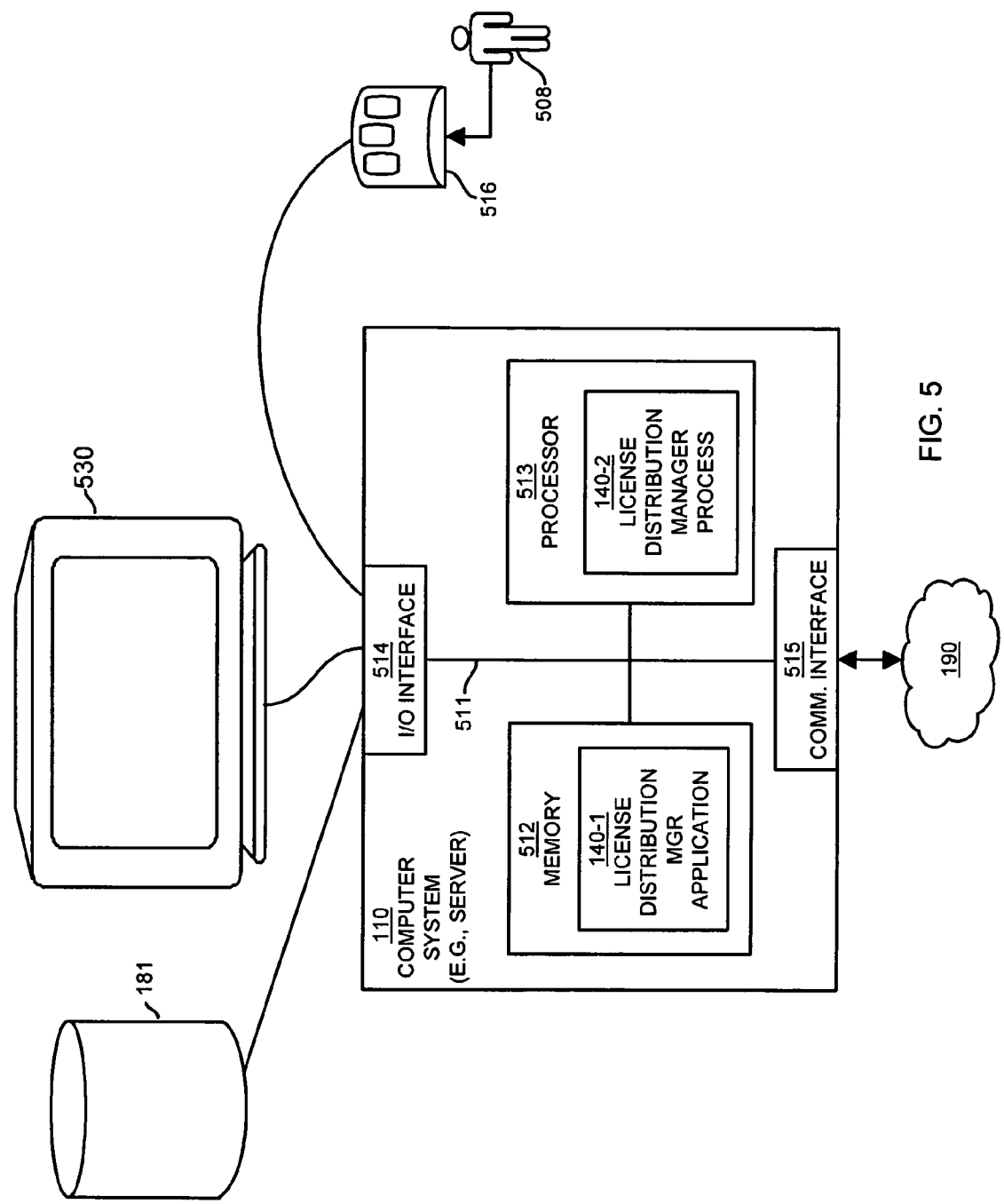
FIG. 5 is an example of a computer environment and corresponding computer system for executing a license distribution manager application and distribution of overdraft licenses according to embodiments herein.

FIG. 5 is a block diagram of a computer environment illustrating an example architecture of a respective computer system 110 (e.g., a server) for implementing license distribution manager 140 (e.g., license distribution manager application 140-1 and/or license distribution manager process 140-2) according to embodiments herein. As previously discussed, server 160 can be configured in a similar way as license distribution manager 140 to support distribution of overdraft licenses according to embodiments herein. Computer system 110 can be a computerized device such as a personal computer, workstation, portable computing device, console, network terminal, processing device, network device, etc.

As shown, computer system 110 of the present example includes an interconnect 511 that couples a memory system 512, a processor 513, I/O interface 514, and a communications interface 515. I/O interface 514 provides connectivity to peripheral devices 516 (if such devices are present) such as a keyboard, mouse (e.g., selection tool 116), display screens (e.g., display medium 530), etc. User 508 (e.g., a server administrator) can provide input to computer system 110. Communications interface 515 enables computer system 110 to communicate over network 190 to retrieve and transmit information as previously discussed.

As shown, memory system 512 is encoded with license distribution manager application 140-1 that supports software license distribution as discussed above and as discussed further below. License distribution manager application 140-1 can be embodied as software code such as data and/or logic instructions (e.g., code stored in the memory or on another computer readable medium such as a disk) that supports processing functionality according to different embodiments described herein. During operation of one embodiment, processor 513 accesses memory system 512 via the use of interconnect 511 in order to launch, run, execute, interpret or otherwise perform the logic instructions of the license distribution manager application 140-1. Execution of the license distribution manager application 140-1 produces processing functionality in license distribution manager process 140-2. In other words, the license distribution manager process 140-2 represents one or more portions of the license distribution manager application 140-1 performing within or upon the processor 513 in the computer system 110.

It should be noted that, in addition to the license distribution manager process 140-2 that carries out method operations as discussed herein, other embodiments herein include the license distribution manager application 140-1 itself (i.e., the un-executed or non-performing logic instructions and/or data). The license distribution manager application 140-1 may be stored on a computer readable medium (e.g., a repository) such as a floppy disk, hard disk or in an optical medium. According to other embodiments, the license distribution manager application 140-1 can also be stored in a memory type system such as in firmware, read only memory (ROM), or, as in this example, as executable code within the memory system 512 (e.g., within Random Access Memory or RAM).

In addition to these embodiments, it should also be noted that other embodiments herein include the execution of the license distribution manager application 140-1 in processor 513 as the license distribution manager process 140-2. Thus, those skilled in the art will understand that the computer system 110 can include other processes and/or software and hardware components, such as an operating system that controls allocation and use of hardware resources.

Functionality supported by computer system 110 and, more particularly, functionality associated with license distribution manager application 140-1 and license distribution manager process 140-2 will now be discussed via flowcharts in FIGS. 6 through 8. For purposes of the following discussion, the license distribution manager 140 (e.g., license distribution manager application 140-1 and/or license distribution manager process 140-2) of computer system 110 generally performs steps in the flowcharts. Server 160 can perform similar functions when so assigned to distribute software licenses as discussed above.

Note that there will be some overlap with respect to concepts discussed above for FIGS. 1 through 5. Also, note that the steps in the below flowcharts need not always be executed in the order shown.

Figure 6:
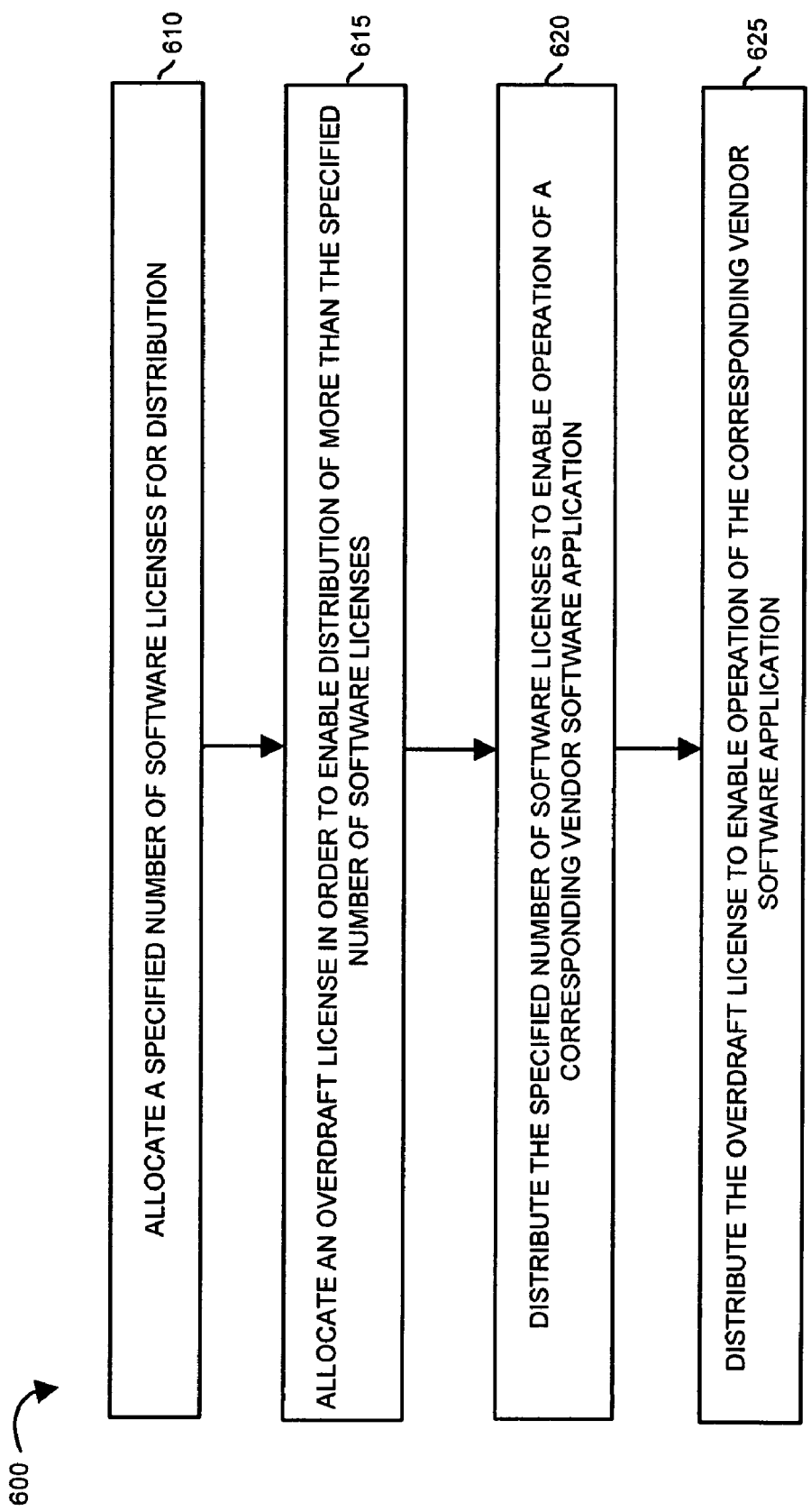
FIG. 6 is a flowchart illustrating a general technique enabling distribution of overdraft licenses according to embodiments herein.

FIG. 6 is a flowchart 600 illustrating a technique facilitating a distribution of overdraft licenses according to embodiments herein. Note that flowchart 600 of FIG. 6 and corresponding text below will make reference to matter previously discussed with respect to FIGS. 1-5.

In step 610, the license distribution manager 140 allocates (e.g., creates and/or stores) a specified number of software licenses in repository 181 for distribution to clients 165.

In step 615, the license distribution manager 140 allocates (e.g., creates and/or stores) at least one overdraft license in order to enable distribution of more than the specified number of software licenses associated with an order (e.g., a purchase order).

In step 620, the license distribution manager 140-1 distributes the specified number of requested software licenses to enable operation of a corresponding vendor software application.

In step 625, the license distribution manager 140-1 distributes one or more of the overdraft licenses to enable operation of the corresponding vendor software application.

Figure 7:
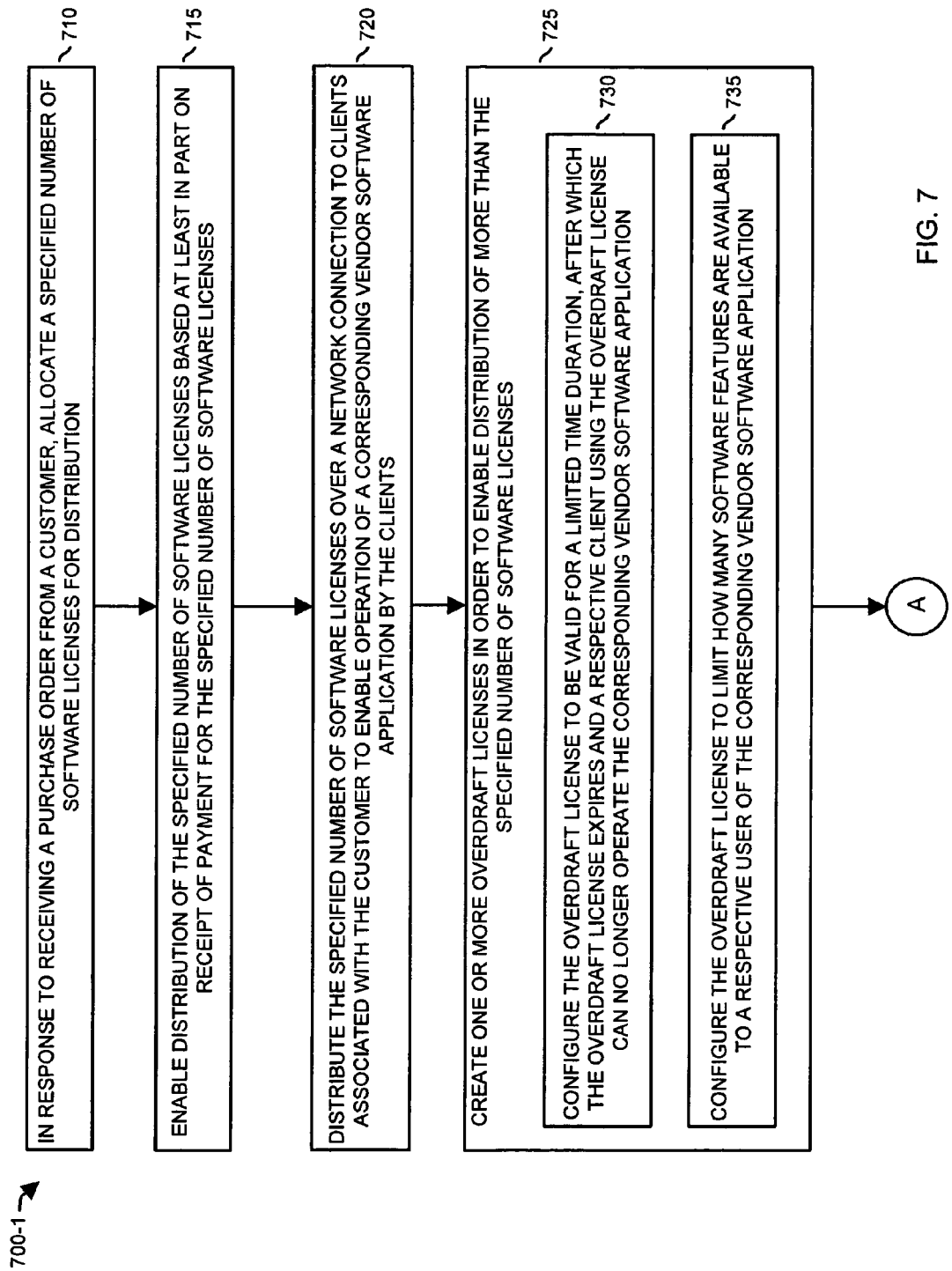
FIGS. 7 and 8 combine to form a flowchart illustrating more specific techniques of distributing overdraft licenses according to embodiments herein.
Figure 8:
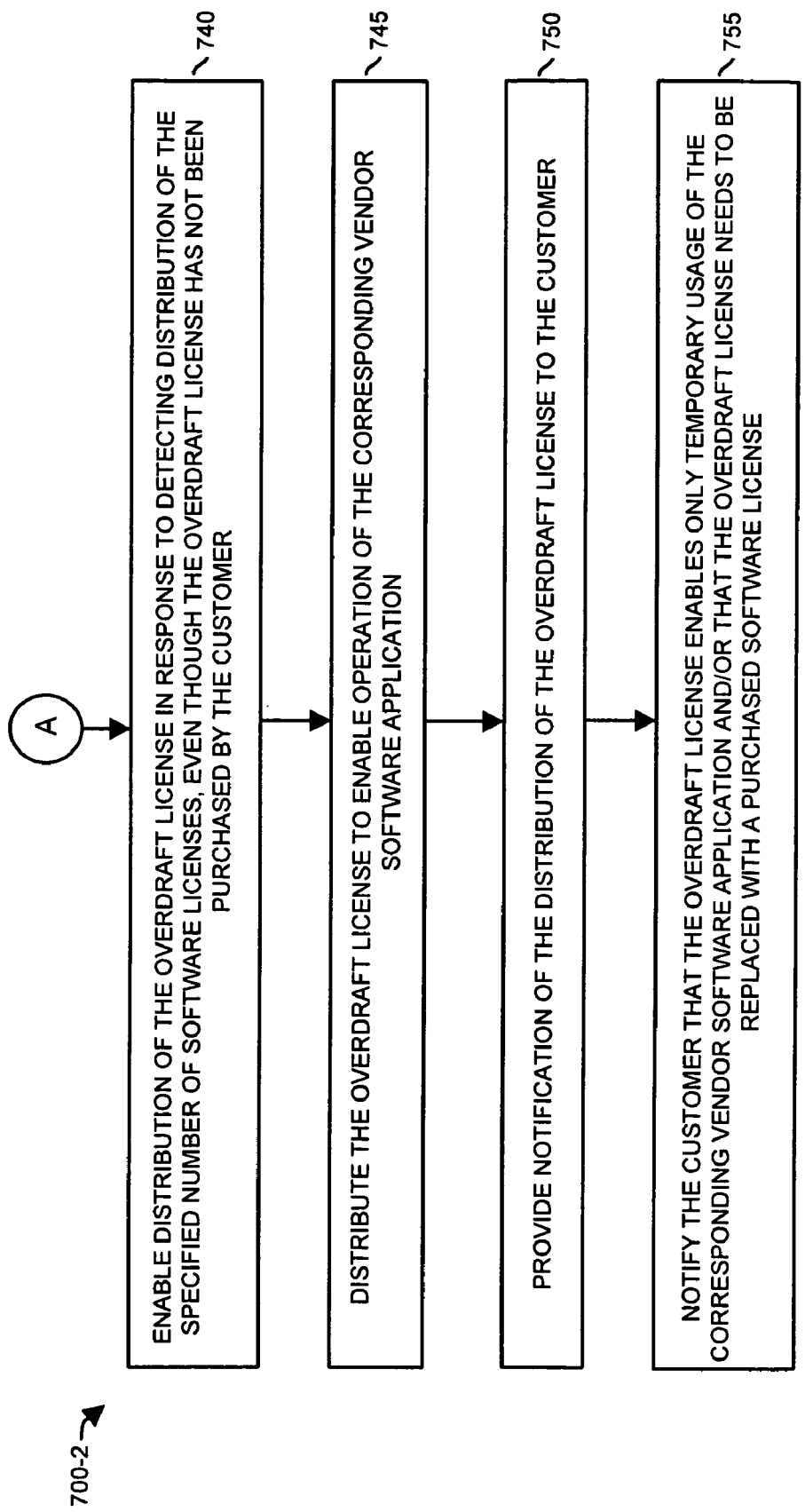

FIGS. 7 and 8 combine to form a flowchart 700 illustrating more specific techniques associated with embodiments herein. Note that according to the present example embodiment, the steps in flowcharts 700-1 and 700-2 (collectively, flowchart 700) are carried out by a processing entity such as license distribution manager 140. However, the entity (e.g., computer system, combination of computer systems, server, etc.) that executes the operational steps below can vary depending on the configuration. For example, server 160 can be programmed to perform similar operations.

In step 710, in response to receiving a purchase order from a customer, the license distribution manager 140 and/or order management system 125 allocates a specified number of software licenses for distribution to clients associated with a customer purchasing multiple software licenses.

In step 715, the license distribution manager 140 enables distribution of the specified number of software licenses (e.g., software licenses in license pool A) based at least in part on receipt of payment for the specified number of software licenses. In other words, the license distribution manager 140 may be configured to prevent distribution of the software licenses until receiving payment or other indication that the customer will pay for the licenses.

In step 720, the license distribution manager 140 distributes the specified number of software licenses over a network connection to clients 165 (associated with the customer purchasing the software licenses) to enable operation of a corresponding vendor software application by the clients 165.

In step 725, the license distribution manager 140 creates and/or allocates one or more overdraft licenses in order to enable distribution of more than the specified number of software licenses in a purchase order.

In step 730, the license distribution manager 140 or other source generating the overdraft licenses configures the overdraft license to be valid for a limited time duration, after which the overdraft license expires and a respective client using the overdraft license can no longer operate the corresponding vendor software application.

In step 735, the license distribution manager 140 or other source generating the overdraft licenses configures the overdraft license to limit how many software features are available to a respective user of the corresponding vendor software application.

In step 740, the license distribution manager 140 enables distribution of one or more overdraft licenses in response to detecting distribution of the specified number of software licenses in a respective purchase order, even though the one or more overdraft licenses which are licenses not yet been purchased by the customer.

In step 745, the license distribution manager 140 distributes the one or more overdraft licenses to enable operation of the corresponding vendor software application by clients 165.

In step 750, the license distribution manager 140 provides notification of the distribution of the overdraft license to the customer.

In step 755, the license distribution manager 140 notifies the customer that the overdraft license enables only temporary usage of the corresponding vendor software application and/or that the overdraft license needs to be replaced with a purchased software license.

Note again that techniques herein are well suited for distribution of overdraft software licenses. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
providing a specified number of software licenses associated with a software application, the specified number of software licenses being distributable to clients to allow the clients to at least one of receive the software application or execute the software application;
providing an overdraft license that is associated with the software application, the overdraft license comprising an identification of features of the software application that the overdraft license is usable to enable;
configuring the overdraft license to expire after a selected time duration, wherein the overdraft license is unusable to enable the features of the software application after the overdraft license expires;
distributing the specified number of software licenses to clients capable of using the software licenses to enable operation of the software application; and
distributing the overdraft license to at least one additional client that is capable of using the overdraft license to enable the features of the software application that the overdraft license is usable to enable.

2. A method as in claim 1, wherein providing the specified number of software licenses is responsive to receiving a purchase order from a customer for the specified number of software licenses, the clients and the at least one additional client being associated with the customer.

3. A method as in claim 2, wherein distributing the specified number of software licenses and the overdraft license comprises:
distributing the specified number of licenses and the overdraft license over a network connection to the clients and the at least one additional client associated with the customer: and
outputting a notification to the customer, the notification notifying the customer that the overdraft license is capable of being used to enable temporary usage of the features of the software application.

4. A method as in claim 3 further comprising:
distributing the specified number of software licenses subsequent to receiving payment for the specified number of software licenses from the customer; and distributing the overdraft license without requiring the customer to pay for the overdraft license.

5. The method of claim 3, further comprising:
distributing the overdraft license before distributing all available software licenses from the specified number of software licenses for distribution.

6. The method of claim 5, wherein distributing the overdraft license before distributing all of the specified number of software licenses includes distributing the overdraft license in response to identifying that remaining available licenses have been explicitly reserved for specified clients.

7. The method of claim 5, wherein distributing the overdraft license before distributing all of the specified number of software licenses includes distributing the overdraft license in response to receiving a request for use of a software license for a duration of time identified as a short duration of time as compared to usage durations of software licenses from the specified number of software licenses.

8. The method of claim 5, further comprising:
configuring the overdraft license to enable more features of the software application then that are enabled by the specified number of software licenses.

9. A method as in claim 1, wherein configuring the overdraft license to expire on the completion of the selected time duration comprises configuring the selected time duration to be measured beginning when the at least one additional client first uses the overdraft license to enable at least one of the features of the software application.

10. A method as in claim 1, wherein the features of the software application that the overdraft license is usable to enable comprises less than all usable features of the software application.

11. A method as in claim 1, wherein distributing the specified number of software licenses occurs in response to receiving respective requests from multiple clients associated with a customer that purchased the specified number of software licenses to enable the multiple clients to operate the software application; and
wherein providing the overdraft license is responsive to receiving a request from the at least one additional client for a license to enable operation of the software application by the at least one additional client.

12. A method as in claim 1 further comprising:
generating a notification to notify the customer that the overdraft license expires on completion of the selected time duration and is unusable to enable the features of the software application when the overdraft license expires.

13. A method as in claim 1, wherein the specified number of software licenses comprise
persistent software licenses capable of enabling perpetual use of the software application,
wherein the overdraft license comprises a temporary software license capable enabling respective use of the features of the software application for a limited amount of time.

14. A method as in claim 1, wherein distributing the specified number of software licenses includes passing out the specified number of software licenses as floating licenses enabling respective clients to operate the software application for only a limited duration of time; and
wherein distributing the overdraft license includes configuring the overdraft license as a floating license; and
enabling distribution of the overdraft license for a limited amount of time.

15. A method as in claim 1 further comprising:
notifying a customer of the distribution of the overdraft license to a the at least one additional client associated with the customer.

16. A method as in claim 1, wherein distributing the specified number of software licenses includes initiating transmission of the software licenses over a network to clients associated with an organization purchasing the specified number of software licenses, the method further comprising:
limiting creation and distribution of overdraft licenses on behalf of the organization depending on the specified number of software licenses distributed to the clients of the customer.

17. A method as in claim 1 further comprising:
enabling distribution of a group of overdraft licenses including the created overdraft license, the number of overdraft licenses in the group being a percentage of the specified number of software licenses.

18. The method of claim 1, further comprising:
configuring the overdraft license to be valid for a limited time duration, after which the overdraft license expires and cannot be used to operate the software application;
configuring the overdraft license to prevent use of features of the software application that are enabled by the specified number of software licenses;
wherein allocating the overdraft license includes configuring the overdraft license to have an associated expiration time that depends on a start time of utilizing the overdraft license to operate the software application; and
configuring the overdraft license to generate a notification that the distributed overdraft license will eventually expire and no longer will be able to operate the software application.

19. The method of claim 18, further comprising:
wherein distributing the specified number of software licenses includes passing out the specified number of software licenses as floating licenses enabling respective clients to operate the software application for only a limited duration of time;
wherein distributing the overdraft license includes configuring the overdraft license as a floating license;
wherein allocating the overdraft license occurs in response to distributing the specified number of software licenses to the multiple clients and thereafter receiving a request from an additional client for a software license to enable operation of the software application by the additional client;
providing notification of the distribution of the overdraft license to a customer that purchased the specified number of software licenses for distribution to clients associated with the respective customer;
limiting creation and distribution of overdraft licenses on behalf of the organization depending on the specified number of software licenses distributed to the clients of the customer; and
enabling distribution of a group of overdraft licenses including the created overdraft license, the number of overdraft licenses in the group being a percentage of the specified number of software licenses.

20. The method of claim 19, further comprising:
distributing the overdraft license before distributing all available software licenses from the specified number of software licenses for distribution, wherein distributing the overdraft license before distributing all of the specified number of software licenses includes distributing the overdraft license in response to identifying that remaining available licenses have been explicitly reserved for specified clients.

21. A computer program product including a non-transitory computer-readable with computer program logic recorded thereon, the computer program product comprising:
   code for providing a specified number of software licenses associated with a software application, the specified number of software licenses being distributable to clients to allow the clients to at least one of receive the software application or execute the software application;
   code for providing an overdraft license that is associated with the software application, the overdraft license comprising an identification of features of the software application that the overdraft license is usable to enable;
   code for configuring the overdraft license to expire on completion of a selected time duration, wherein the overdraft license is unusable to enable the features of the software application when the overdraft license expires;
   code for distributing the specified number of software licenses such that client computers are capable of using the software licenses to enable operation of the software application on the client computers; and
   distributing the overdraft license to at least one additional client computer that is capable of using the overdraft license to enable the features of the software application that the overdraft license is usable to enable.

22. A computer program product as in claim 21, wherein code for providing the specified number of software licenses is responsive to receiving a purchase order from a customer for the specified number of software licenses;
   wherein code for distributing the specified number of software licenses and the code for distributing the overdraft license comprises code for distributing the specified number of software licenses and the overdraft license over a network to clients and the at least one additional client that are associated with the customer, the computer program product further comprising:
   code for notifying the customer that the overdraft license is capable of being used to enable temporary usage of the features of the software application.

23. A computer program product as in claim 21 wherein the features of the software application that the overdraft license is usable to enable comprises less than all usable features of the software application.

24. A computer program product as in claim 23 further comprising:
   code for configuring the specified number of software licenses as persistent software licenses enabling perpetual use of the software application;
   code for configuring the overdraft license as a temporary software license enabling respective use of the software application for a limited amount of time; and
   code for providing a notification to a customer of the distribution of the overdraft license to the at least one additional client associated with the customer.

25. A computer program product as in claim 24, wherein distributing the specified number of software licenses includes initiating transmission of the software licenses over a network to clients associated with an organization purchasing the specified number of software licenses, the method further comprising:
   limiting distribution of overdraft licenses to clients of the organization depending on the specified number of software licenses purchased by the customer.

26. A computer system comprising:
   a processor;
   a memory unit that stores instructions associated with an application executed by the processor; and
   an interconnect coupling the processor and the memory unit, enabling the computer system to execute the application to perform operations of:
      providing a specified number of software licenses associated with a software application, the specified number of software licenses being distributable to clients to allow the clients to at least one of receive the software application or execute the software application;
      providing an overdraft license that is associated with the software application, the overdraft license comprising an identification of features of the software application that the overdraft license is usable to enable;
      configuring the overdraft license to expire on completion of a selected time duration, wherein the overdraft license is unusable to enable the features of the software application when the overdraft license expires;
      distributing the specified number of software licenses to clients capable of using the software licenses to enable operation of the software application; and
      distributing the overdraft license to at least one additional client that is capable of using the overdraft license to enable the features of the software application that the overdraft license is usable to enable.

* * * * *